(12) United States Patent
Chakraborty (10) Patent No.: US 9,276,471 B1
(45) Date of Patent: Mar. 1, 2016

(54) DC-TO-DC CONVERTER CONTROLLERS INCLUDING CLAMPING OR BOOSTING SUBSYSTEMS, AND ASSOCIATED METHODS

(71) Applicant: Volterra Semiconductor Corporation, Fremont, CA (US)

(72) Inventor: Sombuddha Chakraborty, Redwood City, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 226 days.

(21) Appl. No.: 14/030,890

(22) Filed: Sep. 18, 2013

(51) Int. Cl.
 *G05F 1/56* (2006.01)
 *H02M 3/158* (2006.01)
(52) U.S. Cl.
 CPC ..................................... *H02M 3/158* (2013.01)
(58) Field of Classification Search
 USPC .............................. 363/52, 81, 124, 125, 127; 323/282–290, 311, 312, 315
 See application file for complete search history.

(56) References Cited

U.S. PATENT DOCUMENTS

| | | | | |
|---|---|---|---|---|
| 4,386,394 A | * | 5/1983 | Kocher et al. | 363/20 |
| 5,555,165 A | * | 9/1996 | Vinciarelli | 363/95 |
| 6,618,274 B2 | * | 9/2003 | Boylan et al. | 363/17 |
| 8,248,045 B2 | * | 8/2012 | Shiu | 323/265 |
| 8,546,726 B2 | * | 10/2013 | Vogel | 219/130.21 |
| 8,723,490 B2 | * | 5/2014 | Moussaoui et al. | 323/259 |
| 8,847,569 B2 | * | 9/2014 | Terada et al. | 323/285 |
| 8,884,188 B2 | * | 11/2014 | Vogel | 219/130.21 |
| 8,907,642 B1 | * | 12/2014 | Burstein et al. | 323/272 |
| 2003/0039130 A1 | * | 2/2003 | Curtiss | 363/37 |
| 2014/0334195 A1 | * | 11/2014 | Nussbaum et al. | 363/21.04 |

* cited by examiner

*Primary Examiner* — Adolf Berhane
*Assistant Examiner* — Nusrat Quddus
(74) *Attorney, Agent, or Firm* — Lathrop & Gage LLP (57) ABSTRACT

A DC-to-DC converter includes one or more switching circuits, a respective energy storage inductor electrically coupled to each of the one or more switching circuits, and a controller. The controller includes a current deficit signal generator, an integration subsystem, one or more modulators, and a clamping subsystem. The current deficit signal generator is adapted to generate a current deficit signal. The integration subsystem is adapted to integrate the current deficit signal to generate a modulator control voltage. The one or more modulators are adapted to control the one or more switching circuits to transfer power from an input power source to a load, based at least in part on the modulator control voltage. The clamping subsystem is adapted to shunt a portion of the current deficit signal away from the integration subsystem, to prevent the modulator control voltage from falling below a predetermined minimum permissible value.

18 Claims, 7 Drawing Sheets

(PRIOR ART)

DC-TO-DC CONVERTER CONTROLLERS INCLUDING CLAMPING OR BOOSTING SUBSYSTEMS, AND ASSOCIATED METHODS

BACKGROUND

DC-to-DC converters are widely used in electronic devices. For example, many information technology devices include a DC-to-DC converter for converting bulk power from a battery, or from an off-line power supply, to a form suitable for powering a processor or other integrated circuit. Examples of DC-to-DC converters include, but are not limited to, buck-type DC-to-DC converters, boost-type DC-to-DC converters, and buck-boost type DC-to-DC converters.

Many DC-to-DC converters must support a wide range of load current magnitudes while meeting stringent voltage regulation requirements. For example, DC-to-DC converters used to power modern microprocessors often must maintain tight voltage regulation over a wide load current range. The load current may change dramatically in a short time period, such as due to the microprocessor transitioning between a sleep state and an active state.

DC-to-DC converters commonly operate in a continuous conduction mode (CCM), where current continuously flows through the converter's energy storage inductor. As known in the art, CCM operation promotes low ripple current magnitude and fast transient response. However, CCM operation often results in low efficiency at light load. Accordingly, some DC-to-DC converters operate in an alternative mode at light load, such as a discontinuous conduction mode (DCM), to promote light load efficiency. DCM operation is characterized by current flowing through the converter's energy storage inductor being zero during part of each switching cycle. As known in the art, DCM operation is typically more efficient than CCM operation at light load.

Figure 1:
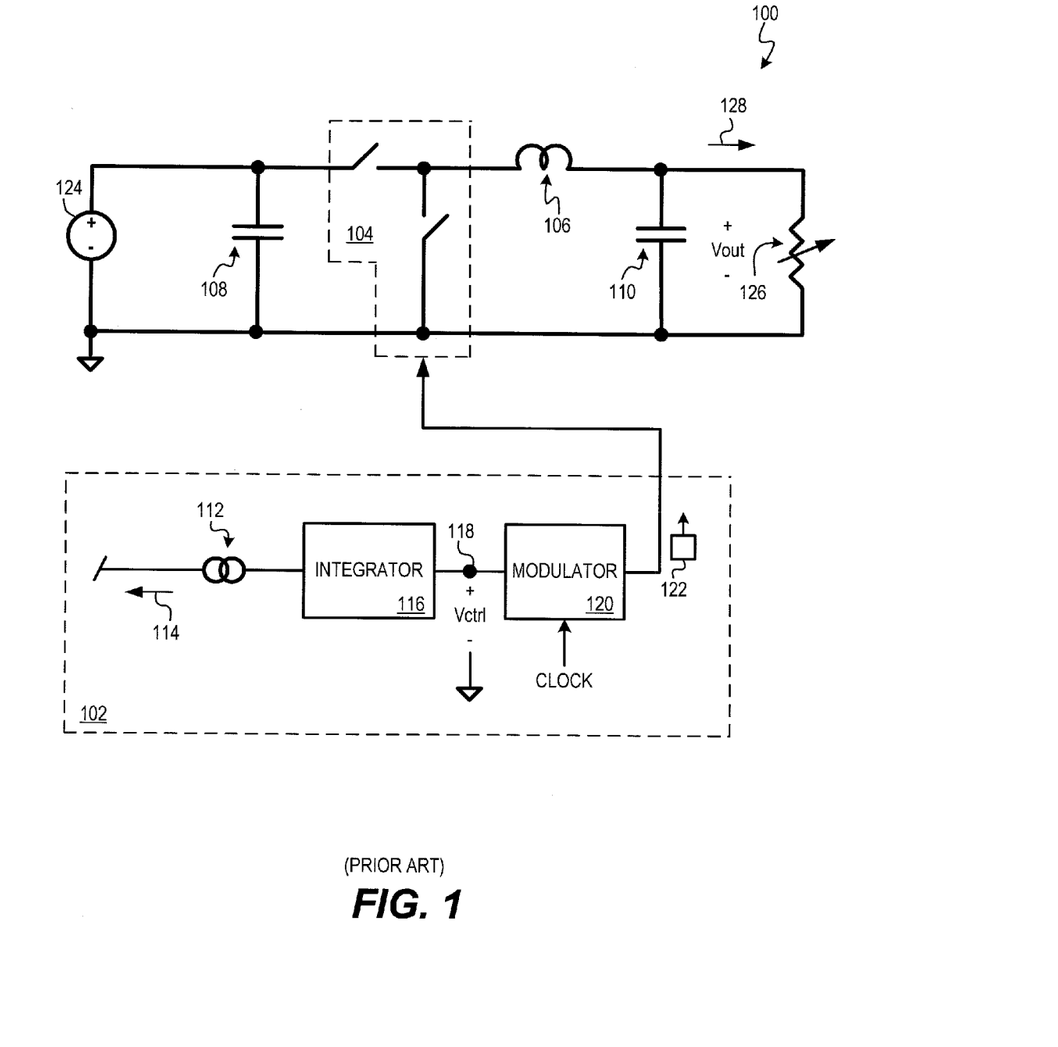
FIG. 1 illustrates a prior art DC-to-DC converter.

FIG. 1 illustrates one prior art buck-type DC-to-DC converter 100 including a DC-to-DC converter controller 102 capable of both CCM and DCM operation. DC-to-DC converter 100 further includes a switching circuit 104, an energy storage inductor 106, an input capacitor 108, and an output capacitor 110. DC-to-DC converter controller 102 includes a current deficit signal generator 112, which generates a current deficit signal 114. Current deficit signal 114 represents a difference between a current command signal of the DC-to-DC converter and an actual current signal of the DC-to-DC converter. An integration subsystem 116 integrates current deficit signal 114 to generate a modulator control voltage Vctrl at a modulator control node 118, which is electrically coupled to a modulator 120. Modulator 120 generates control signals 122, from at least modulator control voltage Vctrl and a clock signal. Control signals 122, which are, for example, pulse width modulation (PWM) signals or pulse frequency modulation (PFM) signals, control switching circuit 104 to cause DC-to-DC converter 100 transfer power from an input power source 124 to a load 126. Modulator 120 is capable of either CCM or DCM operation.

SUMMARY

In an embodiment, a DC-to-DC converter includes one or more switching circuits, a respective energy storage inductor electrically coupled to each of the one or more switching circuits, and a controller. The controller includes a current deficit signal generator, an integration subsystem, one or more modulators, and a clamping subsystem. The current deficit signal generator is adapted to generate a current deficit signal, where the current deficit signal represents a difference between a current command signal of the DC-to-DC converter and an actual current signal of the DC-to-DC converter. The integration subsystem is adapted to integrate the current deficit signal to generate a modulator control voltage. The one or more modulators are adapted to control the one or more switching circuits to transfer power from an input power source to a load, based at least in part on the modulator control voltage. The clamping subsystem is adapted to shunt a portion of the current deficit signal away from the integration subsystem, to prevent the modulator control voltage from falling below a predetermined minimum permissible value.

In an embodiment, a controller for a DC-to-DC converter includes a current deficit signal generator, an amplifier including an inverting input, a non-inverting input, and an output, one or more modulators, and a clamping subsystem. The current deficit signal generator is electrically coupled to an integration node and is adapted to generate a current deficit signal representing a difference between a current command signal of the DC-to-DC converter and an actual current signal of the DC-to-DC converter. The amplifier's inverting input is electrically coupled to the integration node, the amplifier's non-inverting input is electrically coupled to a common mode power supply rail, and the amplifier's output is electrically coupled to a modulator control node. The one or more modulators are adapted to control one or more switching circuits of the DC-to-DC converter to transfer power from an input power source to a load, based at least in part on a voltage at the modulator control node. The clamping subsystem is adapted to shunt a portion of the current deficit signal away from the integration node, to prevent the voltage at the modulator control node from falling below a predetermined minimum permissible value.

In an embodiment, a method for controlling a DC-to-DC converter includes (1) integrating a current deficit signal to generate a modulator control voltage; (2) generating control signals to control a switching circuit of the DC-to-DC converter based on at least the modulator control voltage, to transfer power from an input power source to a load; and (3) preventing the modulator control voltage from falling below a predetermined minimum permissible value.

In an embodiment, a DC-to-DC converter includes one or more switching circuits, a respective energy storage inductor electrically coupled to each of the one or more switching circuits, and a controller. The controller includes a current deficit signal generator, an integration subsystem, one or more modulators, and a boosting subsystem. The current deficit signal generator is adapted to generate a current deficit signal, where the current deficit signal represents a difference between a current command signal of the DC-to-DC converter and an actual current signal of the DC-to-DC converter. The integration subsystem is adapted to integrate the current deficit signal to generate a modulator control voltage. The one or more modulators are adapted to control the one or more switching circuits to transfer power from an input power source to a load, based at least in part on the modulator control voltage. The boosting subsystem is adapted to boost the modulator control voltage in response to a signal indicating an operating mode change of the DC-to-DC converter.

DETAILED DESCRIPTION OF THE EMBODIMENTS

While DC-to-DC converter controller 102 of FIG. 1 supports both CCM and DCM operation, Applicants have discovered that the controller has a drawback in some situations. In particular, Applicants have discovered that controller 102 may sometimes react slowly to a change in operating modes, because significant time is required for integration subsystem 116 to integrate current signal 114 and thereby change modulator control voltage Vctrl, as required by the operating mode change. Such slow reaction may result in a transient of the DC-to-DC converter's output voltage. Consider, for example, a situation where DC-to-DC converter 100 is powering a very light load 126, and controller 102 is operating in DCM to promote high efficiency. Deficit current 114 will likely have a negative polarity for a significant time period, resulting in saturation of integration subsystem 116 and modulator control voltage Vctrl being close to a negative power supply rail voltage. If the DC-to-DC converter's load current 128 suddenly increases, deficit current 114 will become positive, and modulator control voltage Vctrl will begin to rise. It will take significant time, however, for integration subsystem 116 to integrate deficit current signal 114 and thereby cause modulator control voltage Vctrl to rise from near the negative power supply rail's voltage to a value appropriate for increased load current 128. Modulator 120 will not compensate for the load current increase until modulator control voltage Vctrl reaches the value appropriate for the increased load current, resulting in a sagging transient of the DC-to-DC converter's output voltage Vout.

Figure 2:
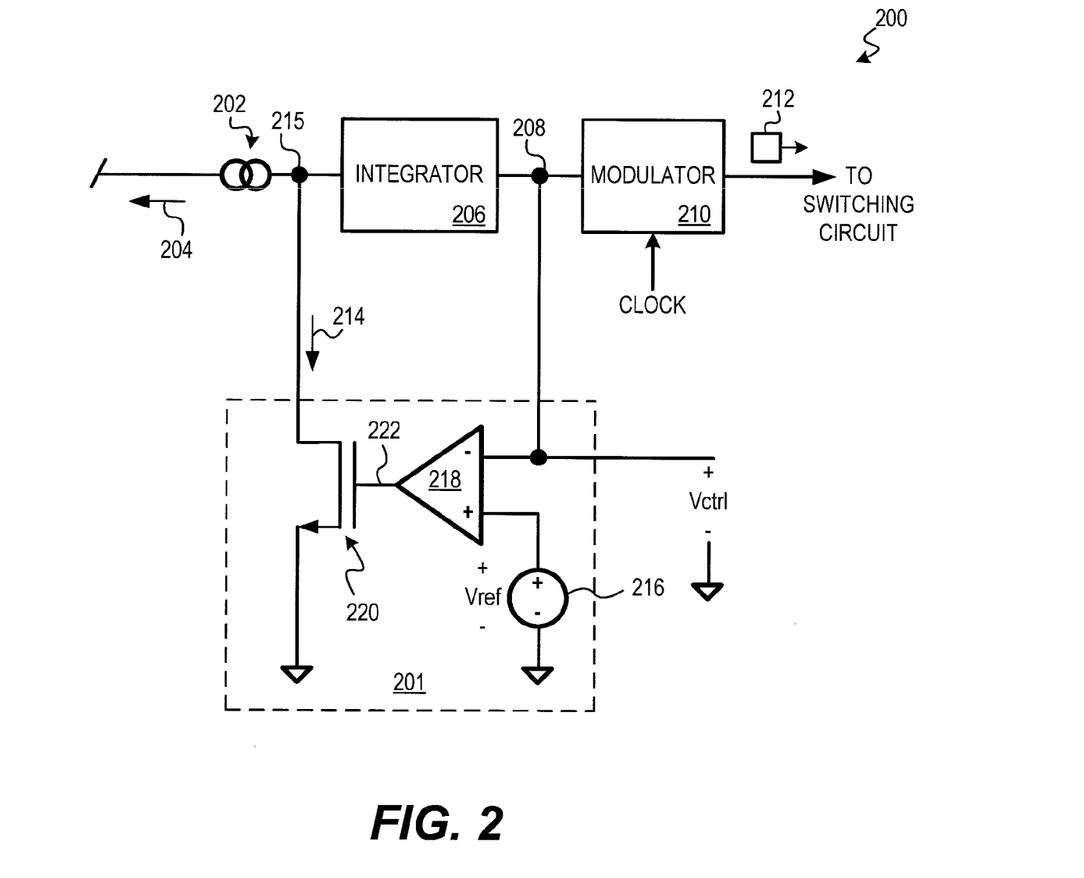
FIG. 2 illustrates a DC-to-DC converter controller including a clamping subsystem, according to an embodiment.

Applicants have discovered that such problem can be reduced, or even essentially eliminated, by constraining the modulator control voltage to a minimum permissible value, such as during light load conditions. FIG. 2 illustrates a DC-to-DC converter controller 200 including a clamping subsystem 201 adapted to constrain the modulator control voltage to a minimum permissible value. DC-to-DC converter controller 200 includes a current deficit signal generator 202, an integration subsystem 206, and a modulator 210, which are similar to current deficit signal generator 112, integration subsystem 116, and modulator 120 of FIG. 1. Current deficit signal generator 202 generates a current deficit signal 204 representing a difference between a current command signal of the DC-to-DC converter and an actual current signal of the DC-to-DC converter. The current command signal represents a difference between a desired output voltage of the DC-to-DC converter and an actual output voltage of the DC-to-DC converter, and the actual current signal represents current flowing through the DC-to-DC converter.

Integration subsystem 206 integrates deficit current signal 204 to generate a modulator control voltage Vctrl at a modulator control node 208, which is electrically coupled to modulator 210. Modulator 210 generates control signals 212, from at least modulator control voltage Vctrl and a clock signal. Control signals 212 control one or more switching circuits of the DC-to-DC converter to cause the DC-to-DC converter to transfer power from an input power source to a load. Modulator 210 is typically capable of operating in at least two different modes, depending on a magnitude of the DC-to-DC converter's load current. For example, in one embodiment, modulator 210 operates in CCM at moderate and heavy loads, and modulator 210 operates in DCM at light loads. Modulator 210 could also support additional operating modes, such as a tri-state mode, where all switching circuit devices operate in their non-conductive states, without departing from the scope hereof.

Clamping subsystem 201 shunts a portion of current deficit signal 204, designated as shunt current signal 214, away from an integration node 215 and integration subsystem 206, as required to prevent modulator control voltage Vctrl from falling below a predetermined minimum value. Clamping subsystem 201 includes a voltage source 216 which generates a reference voltage Vref, an amplifier 218, and a current control device 220. Amplifier 218 amplifies a difference between reference voltage Vref and modulator control voltage Vctrl. An output 222 of amplifier 218 controls current control device 220, such that shunt current signal 214 has a magnitude required to prevent modulator control voltage Vctrl from falling below reference voltage Vref. Reference voltage Vref is chosen to be close to, but below, a minimum threshold value of modulator control voltage Vctrl required for modulator 210 to cause the DC-to-DC converter to transfer power from the input power source to the load. Setting reference voltage Vref at such magnitude helps DC-to-DC converter controller 200 respond quickly to an operating mode change, without interfering with regulation during light load conditions. In contrast, if magnitude of Vref were instead set at or above the minimum threshold value of modulator control voltage Vctrl required for the DC-to-DC converter power transfer, the DC-to-DC converter would attempt to supply excessive load current, resulting in excessive converter output voltage.

Constraining modulator control voltage Vctrl to a minimum value of reference voltage Vref reduces the need for integration subsystem 206 to increase modulator control voltage Vctrl in response to a change from a low power operating mode to a high power operating mode. For example, consider an embodiment where reference voltage Vref is 1.5 volts. Assume that controller 200 is operating in DCM and powering a light load, such that deficit current signal 204 has a negative polarity. Clamping subsystem 201 controls magnitude of shunt current 214 such that modulator control voltage Vctrl does not fall below 1.5 volts. Now assume that the DC-to-DC converter's load current significantly increases, and the DC-to-DC converter therefore switches from DCM to CCM. Also assume that the appropriate modulator control voltage Vctrl value for the increased load current is 2.0 volts. Integration subsystem 206 need only increase modulator control voltage Vctrl by 0.5 volts to compensate for the load current change, thereby allowing controller 200 to respond relatively quickly to the load current change. In contrast, if clamping subsystem 201 were omitted, modulator control voltage Vctrl would be near a negative power supply rail voltage during DCM operation, and integration subsystem 206 would need to increase modulator control voltage Vctrl by nearly 2.0 volts, assuming the negative power supply rail was grounded, to compensate for the load current change, thereby delaying the controller's response to the change.

Clamping subsystem 201 could be modified without departing from the scope hereof. For example, although current control device 220 is shown as including a single transistor, current control device 220 could alternately include multiple transistors and/or other circuitry, such as a current source. As another example, the n-channel transistor of current control device 220 could be replaced with a p-channel transistor, with appropriate changes to amplifier 218. Additionally, in some alternate embodiments, current deficit signal generator 202 is modified such that the polarity of current deficit signal 204 is reversed, and clamping subsystem 201 is modified to inject current into integration node 215, as required to prevent modulator control voltage Vctrl from exceeding a maximum permissible value.

Figure 3:
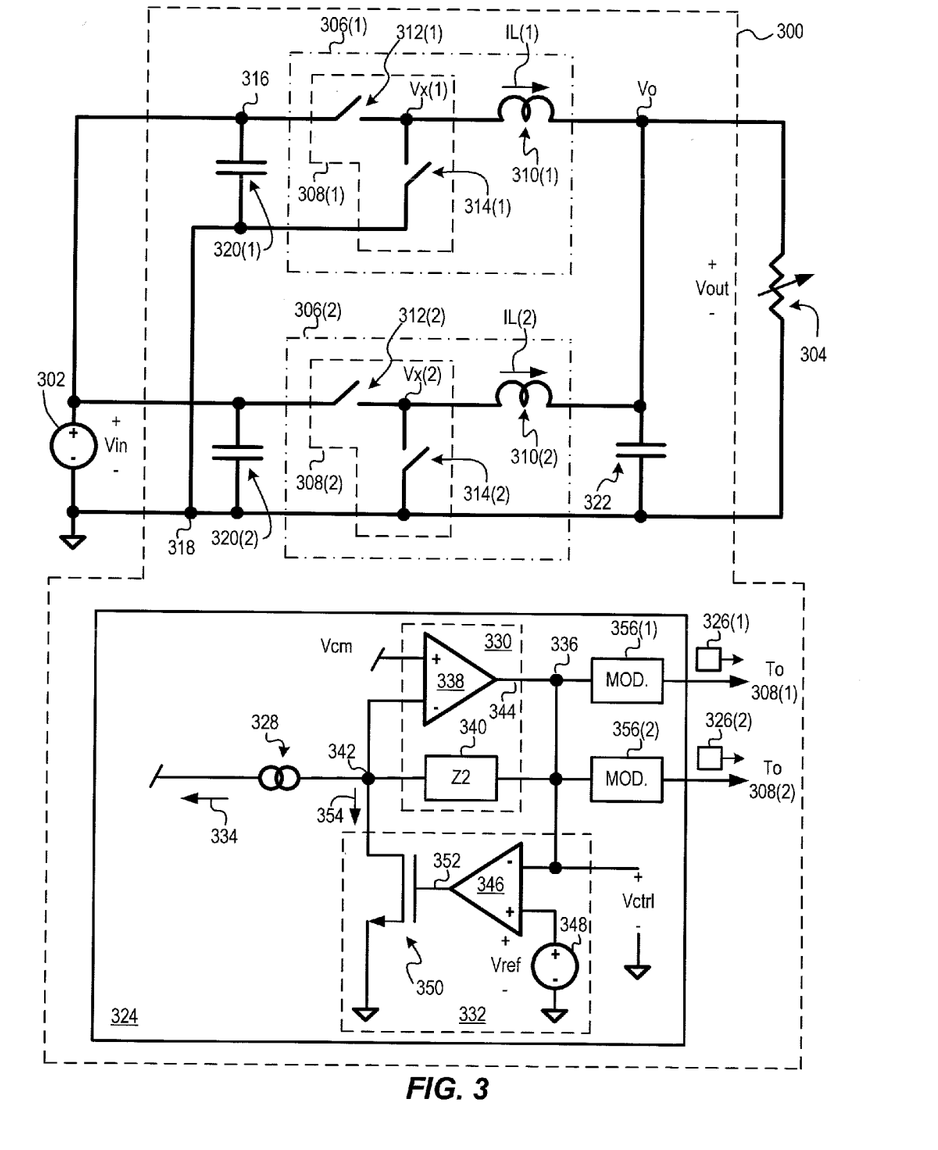
FIG. 3 illustrates a DC-to-DC converter including a controller similar to that of FIG. 2, according to an embodiment.

FIG. 3 illustrates a DC-to-DC converter 300 including a controller similar to that of FIG. 2. Converter 300 is a buck-type DC-to-DC converter which transfers power from an input power source 302 to a load 304. Converter 300 includes one or more phases 306. In this document, specific instances of an item may be referred to by use of a numeral in parentheses (e.g., phase 306(1)) while numerals without parentheses refer to any such item (e.g., phases 306). Although converter 300 is shown having two phases 306, converter 300 could have a different numbers of phase without departing from the scope hereof. Thus, converter 300 can be described as having N phases, where N is an integer greater than or equal to one. Each phase 306 includes a switching circuit 308 electrically coupled to a respective energy storage inductor 310. In certain embodiments, two or more of inductors 310 are magnetically coupled to improve converter performance relative to a converter with discrete, uncoupled, inductors 310.

Each switching circuit 308 includes a high side switching device 312 and a low side switching device 314 electrically coupled at a switching node Vx. The high side switching device 312 and energy storage inductor 310 of each phase 306 are electrically coupled in series between a positive input node 316 and an output node Vo. The low side switching device 314 of each phase 306 is electrically coupled between the switching node Vx of the phase and a reference node 318. At least one input capacitor 320 is electrically coupled between nodes 316, 318 to supply ripple current to converter 300, and at least one output capacitor 322 is electrically coupled between nodes Vo, 318 to filter ripple current from converter 300 and to help support transient loads.

Switching devices 312, 314, for example, include one or more transistors. In the embodiment of FIG. 3, high side switching device 312 is a control switching device in that output voltage Vout is a function of the switching device's duty cycle. Low side switching device 314 is a freewheeling device in that it provides a path for inductor current IL when the control switching device turns off. Thus, low side switching device 314 couples energy stored in inductor 310 to load 304. In some embodiments, low side switching device 314 is replaced with or supplemented by a diode.

Converter 300 further includes a controller 324 for generating control signals 326(1) and 326(2) for controlling switching circuits 308(1) and 308(2), respectively. For simplicity of illustration, connections between controller 324 and switching circuits 308 are not shown. Controller 324 is implemented, for example, by a combination of digital and analog circuitry. In some embodiments, controller 324 is partially implemented by a processor executing instructions in the form of software or firmware.

Figure 4:
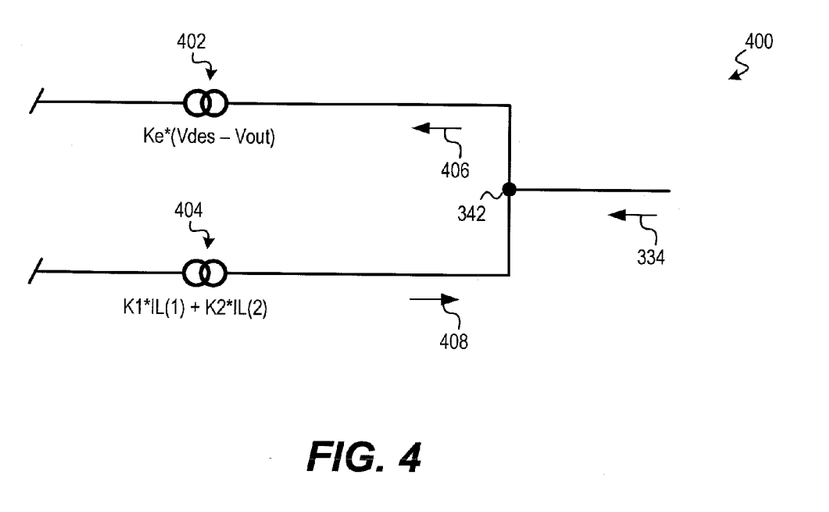
FIG. 4 shows a current deficit signal generator, according to an embodiment.

Controller 324 includes current deficit signal generator 328, an integration subsystem 330, and a clamping subsystem 332, which are similar to current deficit signal generator 202, integration subsystem 206, and clamping subsystem 201 of FIG. 2. Specifically, current deficit signal generator 328 generates a current deficit signal 334 representing a difference between a current command signal of the DC-to-DC converter and an actual current signal of the DC-to-DC converter. FIG. 4 shows a current deficit signal generator 400, which is one possible implementation of current deficit signal generator 328. Current deficit signal generator 400 includes first and second current sources 402 and 404, which generates a current command signal 406 and an actual current signal 408, respectively. Current command signal 406 (I406) is expressed as follows, where Ke is a scaling factor Ke, Vdes is a desired output voltage of the DC-to-DC converter, and Vout is an actual output voltage of the DC-to-DC converter:

$$I406=Ke*(Vdes-Vout) \qquad \text{EQN. 1}$$

Actual current signal 408 (I408) is expressed as follows, where K1 and K2 are scaling factors, IL(1) is current through energy storage inductor 310(1), and IL(2) is current through energy storage inductor 310(2):

$$I408=K1*IL(1)+K2*IL(2) \qquad \text{EQN. 2}$$

First and second current sources 402, 404 are electrically coupled at an integration node 342 such that current deficit signal 334 is the difference between current command signal 406 and actual current signal 408. In other words, the sum of actual current signal 408 and current deficit signal 334 equals current command signal 406.

Returning to FIG. 3, integration subsystem 330 integrates current deficit signal 334 to generate a modulator control voltage Vctrl at a modulator control node 336. Integration subsystem 330 includes an amplifier 338 and an impedance network 340. Impedance network 340 is electrically coupled between integration node 342 and modulator control node 336. An inverting input of amplifier 338 is electrically coupled to integration node 342, a non-inverting input of amplifier 338 is electrically coupled to a common mode power supply rail Vcm, and an output 344 of amplifier 338 is electrically coupled to modulator control node 336. Voltage at common mode power supply rail Vcm is between the respective voltages of amplifier 338's positive and negative power supply rails (not shown).

Clamping subsystem 332 includes an amplifier 346, a voltage source 348, and current control device 350. Amplifier 346 amplifies a difference between reference voltage Vref and modulator control voltage Vctrl. An output 352 of amplifier 346 controls current control device 350, such that clamping subsystem 332 shunts a portion of current deficit signal 334, designated as shunt current signal 354, away from integration node 342 and integration subsystem 330, to prevent modulator control voltage Vctrl from falling below reference voltage Vref. Constraining modulator control voltage Vctrl to a minimum permissible value of reference voltage Vref helps speed controller 324's response to a change in operating modes, in a manner analogous to that discussed above with respect to FIG. 2.

In some alternate embodiments, voltage source 348 is omitted, and common mode power supply rail Vcm, or another power supply rail, provides voltage reference Vref. Additionally, although current control device 350 is shown as being a single n-channel transistor, current control device 350 could alternately be implemented by one or more alternate transistors, and/or by one or more additional transistors. Furthermore, current control device 350 could alternately be implemented by a current source controlled by amplifier 346 output 352.

Controller 324 further includes a respective modulator 356 for each phase 306. Each modulator 356 generates respective control signals 326 from at least modulator control voltage Vctrl and one or more clock signals (not shown). Modulator 356(1) generates control signals 326(1), which are communicatively coupled to switching circuit 308(1) to control switching devices 312(1), 314(1), and modulator 356(2) generates control signals 326(2), which are communicatively coupled to switching circuit 308(2) to control switching devices 312(2), 314(2). Each modulator 356 causes its respective switching circuit 308 to repeatedly switch its switching node Vx between nodes 316 and 318, thereby switching node Vx between two different voltage levels, to transfer power from input power source 302 to load 304. Modulators 356 typically cause their respective switching circuits 308 to switch at a frequency of at least 50 KHz to minimize ripple, to promote fast transient response, and to cause DC-to-DC converter 300 to operate at a frequency range outside of that perceivable by humans. Additionally, modulators 356 are typically configured to cause switching circuits 308 to switch out-of-phase with respect to each other, to achieve ripple current cancellation and fast transient response.

In certain embodiments, modulators 356 are capable of operating in two or more different modes. For example, in one embodiment, modulators 356 operate in (1) CCM during moderate and heavy load conditions, (2) DCM during light load conditions, and (3) a tri-state mode during very light load conditions. The tri-state mode is characterized by both switching devices 312, 314 of each switching circuit 308 being in their non-conductive states, such that output voltage Vout is allowed to float. In some embodiments, clamping subsystem 332 is active only during light and/or very light load conditions. Although each modulator 356 is symbolically shown as being a discrete element, one or more modulators 356 are part of common module in some embodiments.

Figure 5:
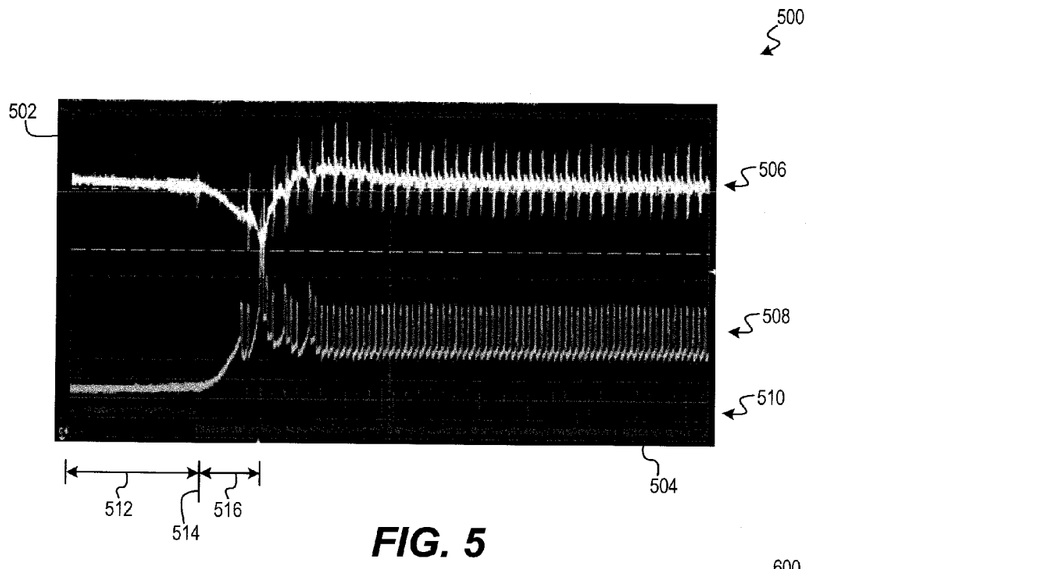
FIG. 5 shows waveforms of a DC-to-DC converter including a controller similar to that of FIG. 1

Applicants evaluated the performance of DC-to-DC converters with and without clamping subsystems to determine effectiveness of the clamping subsystems. FIG. 5 shows a graph 500 of waveforms of a DC-to-DC converter including a controller similar to controller 102 of FIG. 1. Vertical axis 502 represents voltage, and horizontal axis 504 represent time. Top curve 506 represents converter output voltage, middle curve 508 represents modulator control voltage, and bottom curve 510 represents control signals generated by the modulator and communicatively coupled to a switching circuit of the DC-to-DC converter. During time period 512, the DC-to-DC converter is operating in a tri-state mode and supplying a very light load current. Accordingly, modulator control voltage 508 is saturated near a negative power supply rail's voltage. At time 514, however, load current significantly increases, and the DC-to-DC converter switches from the tri-state mode to CCM. It takes significant time 516 for modulator control voltage 508 to rise to a level appropriate for the heavy load, resulting in a dip in the DC-to-DC converter's output voltage 506 during time 516.

Figure 6:
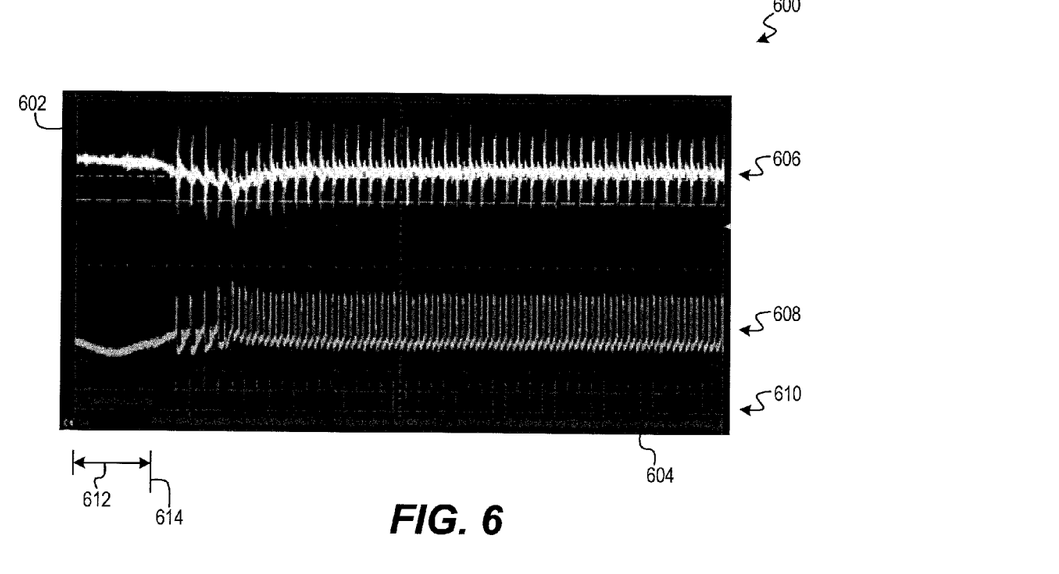
FIG. 6 shows waveforms of a DC-to-DC converter including a controller similar to that of FIG. 2.

FIG. 6 shows a graph 600 like that of FIG. 5, but showing the waveforms of a DC-to-DC converter including a controller similar to controller 200 of FIG. 2 in place of a controller similar to controller 102 of FIG. 1. Like FIG. 5, vertical axis 602 represents voltage, horizontal axis 604 represents time, top curve 606 represent converter output voltage, middle curve 608 represents modulator control voltage, and bottom curve 610 represents control signals generated by the modulator and communicatively coupled to a switching circuit of the DC-to-DC converter. During time period 612, the DC-to-DC converter is operating in a tri-state mode and supplying a very light load current. However, in contrast to the scenario of FIG. 5, modulator control voltage 608 is constrained to a minimum permissible value by a clamping subsystem, such that modulator control voltage 608 is significantly greater than zero. Thus, when the load current significantly increases at time 614 and the converter switches to CCM, modulator control voltage 608 does not have to rise far to reach a level appropriate for the heavy load. Accordingly, there is little dip in output voltage 606. Thus, a comparison of FIGS. 5 and 6 shows that use of a clamping subsystem can significantly improve DC-to-DC converter output voltage regulation after a changing from a low power mode to a high power mode.

Figure 7:
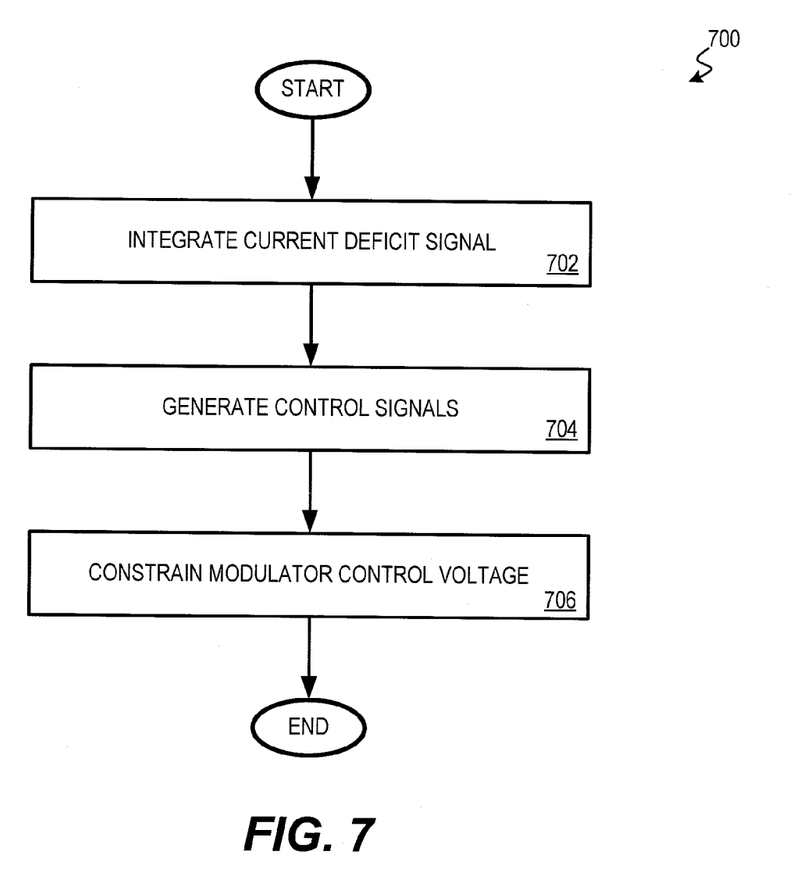
FIG. 7 shows a method for controlling a DC-to-DC converter to constrain a modulator control voltage from falling below a predetermined minimum permissible value, according to an embodiment.

FIG. 7 shows a method 700 for controlling a DC-to-DC converter to constrain a modulator control voltage from falling below a predetermined minimum permissible value. In step 702, a current deficit signal is integrated to generate a modulator control voltage, where the current deficit signal represents a difference between a current command signal of the DC-to-DC converter and an actual current signal of the DC-to-DC converter. In one example of step 702, integration subsystem 330 of FIG. 3 integrates current deficit signal 334 to generate modulator control voltage Vctrl. In step 704, control signals are generated to control a switching circuit of the DC-to-DC converter based at least on the modulator voltage. In one example of step 704, modulator 356(1) generates control signals 326(1) based at least on modulator control voltage Vctrl. In step 706, the modulator control voltage is prevented from falling below the predetermined minimum permissible value. In one example of step 706, clamping subsystem 332 shunts a portion 354 of current deficit signal 334 away from integration subsystem 330, to prevent modulator control voltage Vctrl from falling below a value of reference voltage Vref.

Figure 8:
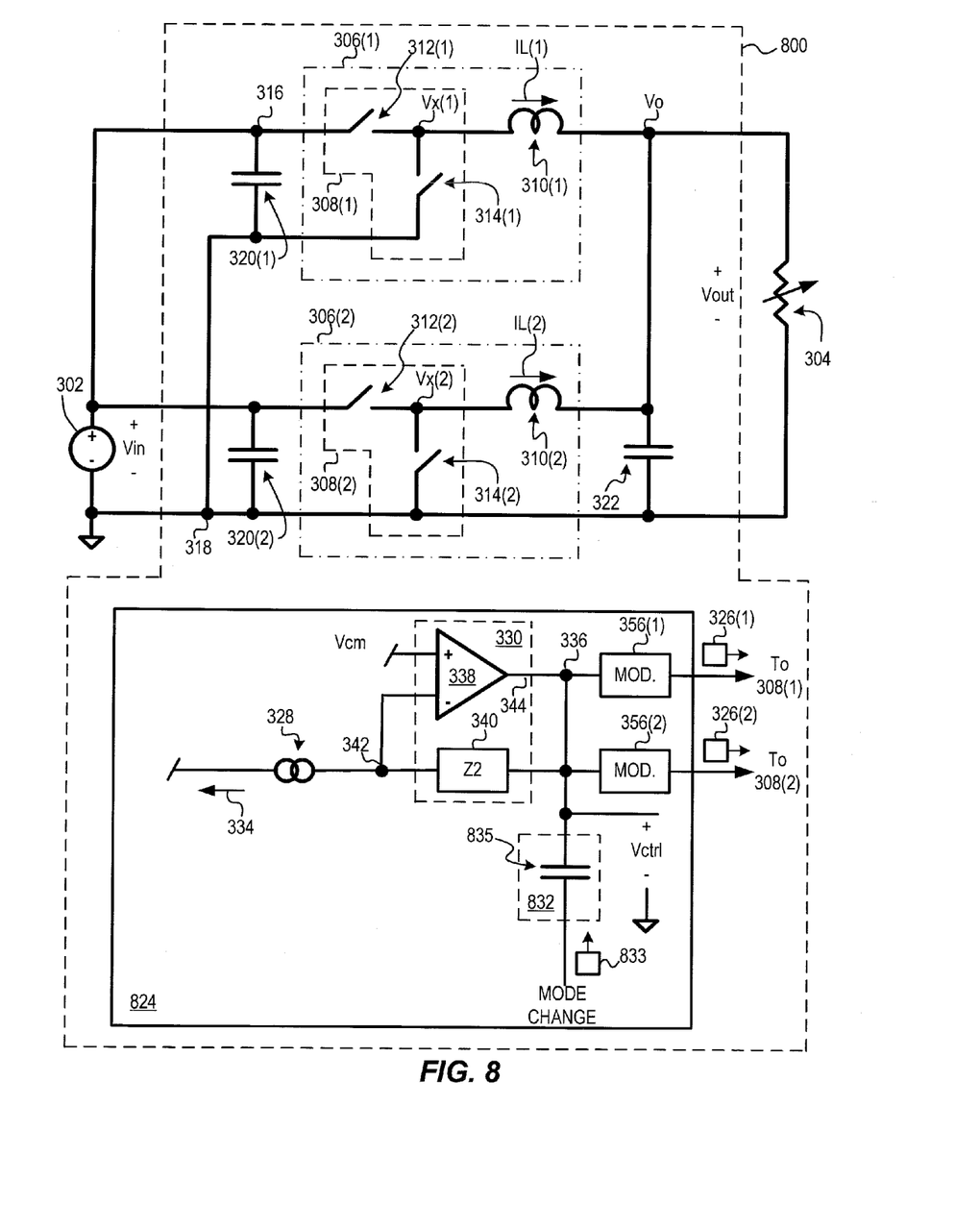
FIG. 8 illustrates a DC-to-DC converter similar to that of FIG. 3, but including a controller with a boosting subsystem in place of a clamping subsystem, according to an embodiment.

DC-to-DC controller response to an operating mode change could alternately be speeded by directly modifying the modulator control voltage in response to an operating mode change. FIG. 8 illustrates a DC-to-DC converter 800 similar to that of FIG. 3, but including a controller 824 with a boosting subsystem 832 in place of clamping subsystem 332. Boosting subsystem 832 is adapted to boost modulator control voltage Vctrl in response to a signal 833 indicating that DC-to-DC converter 800 is switching from a low power operating mode to a high power operating mode. Boosting subsystem 832, for example, injects current into modulator control node 336 in response to assertion of signal 833, thereby assisting integration subsystem 330 with raising modulator control voltage Vctrl in response to an operating mode change. Boosting subsystem 832 thus helps speed increase of modulator control voltage Vctrl in response to a change from a low power mode to a high power mode, thereby promoting fast response of controller 824 to the operating mode change. In the illustrated embodiment, boosting subsystem 832 includes a capacitor 835 coupled between modulator control node 336 and signal 833, such that current flows through capacitor 835 to modulator control node 336, in response to assertion of signal 833. Boosting subsystem 832 could be implemented in other manners, however, without departing from the scope hereof.

Combinations of Features

Features described above as well as those claimed below may be combined in various ways without departing from the scope hereof. The following examples illustrate some possible combinations:

(A1) A DC-to-DC converter may include one or more switching circuits, a respective energy storage inductor electrically coupled to each of the one or more switching circuits, and a controller. The controller may include the following: (1)

a current deficit signal generator adapted to generate a current deficit signal, the current deficit signal representing a difference between a current command signal of the DC-to-DC converter and an actual current signal of the DC-to-DC converter, (2) an integration subsystem adapted to integrate the current deficit signal to generate a modulator control voltage, (3) one or more modulators adapted to control the one or more switching circuits to transfer power from an input power source to a load, based at least in part on the modulator control voltage, and (4) a clamping subsystem adapted to shunt a portion of the current deficit signal away from the integration subsystem, to prevent the modulator control voltage from falling below a predetermined minimum permissible value.

(A2) In the DC-to-DC converter denoted as (A1), the predetermined minimum permissible value may be below a minimum threshold value of the modulator control voltage required for the one or more modulators to cause the one or more switching circuits to transfer power from the input power source to the load.

(A3) In either of the DC-to-DC converters denoted as (A1) or (A2), the clamping subsystem may include the following: (1) a voltage source adapted to generate a reference voltage having the predetermined minimum permissible value, (2) a first amplifier adapted to amplify a difference between the reference voltage and the modulator control voltage, and (3) a current control device controlled by an output of the first amplifier and adapted to shunt the portion of the current deficit signal away from the integration subsystem.

(A4) In the DC-to-DC converter denoted as (A3), the current control device may include a transistor adapted to shunt the portion of the current deficit signal away from the integration subsystem.

(A5) In any of the DC-to-DC converters denoted as (A1) through (A4), the current deficit signal generator may include the following: (1) a first current source adapted to generate the current command signal, the current command signal being proportional to a difference between a desired output voltage of the DC-to-DC converter and an actual output voltage of the DC-to-DC converter, and (2) a second current source electrically coupled to the first current source, the second current source adapted to generate the actual current signal, the actual current signal being proportional to a sum of current flowing through each energy storage inductor.

(A6) In the DC-to-DC converter denoted as (A5): (1) the first current source may be electrically coupled to the second current source at an integration node, (2) the integration subsystem may be electrically coupled between the integration node and a modulator control node, (3) the integration subsystem may be adapted to set a voltage at the modulator control node to the modulator control voltage, (4) each of the one or more modulators may be electrically coupled to the modulator control node.

(A7) In the DC-to-DC converter denoted as (A6), the integration subsystem may include the following: (1) a second amplifier adapted to amplify a difference between a voltage at a common mode power supply rail and a voltage at the integration node, an output of the second amplifier being electrically coupled to the modulator control node, and (2) an impedance network electrically coupled between the integration node and the modulator control node.

(A8) Any of the DC-to-DC converters denoted as (A1) through (A7) may be a multi-phase buck-type converter.

(B1) A controller for a DC-to-DC converter may include the following: (1) a current deficit signal generator electrically coupled to an integration node, the current deficit signal generator adapted to generate a current deficit signal representing a difference between a current command signal of the DC-to-DC converter and an actual current signal of the DC-to-DC converter, (2) an amplifier including an inverting input, a non-inverting input, and an output, the inverting input electrically coupled to the integration node, the non-inverting input electrically coupled to a common mode power supply rail, and the output electrically coupled to a modulator control node, (3) one or more modulators adapted to control one or more switching circuits of the DC-to-DC converter to transfer power from an input power source to a load, based at least in part on a voltage at the modulator control node, and (4) a clamping subsystem adapted to shunt a portion of the current deficit signal away from the integration node, to prevent the voltage at the modulator control node from falling below a predetermined minimum permissible value.

(B2) In the controller denoted as (B1), the predetermined minimum permissible value may be below a minimum threshold value of the modulator control voltage required for the one or more modulators to cause the one or more switching circuits to transfer power from the input power source to the load.

(B3) In either of the controllers denoted as (B1) or (B2), the clamping subsystem may include the following: (1) a voltage source adapted to generate a reference voltage having the predetermined minimum permissible value, (2) an additional amplifier adapted to amplify a difference between the reference voltage and the voltage at the modulator control node, and (3) a current control device controlled by an output of the additional amplifier and adapted to shunt the portion of the current deficit signal away from the integration node.

(B4) In the controller denoted as (B3), the current control device may include a transistor adapted to shunt current away from the integration node.

(B5) In any of the controllers denoted as (B1) through (B4), the current deficit signal generator may include the following: (1) a first current source adapted to generate the current command signal, the current command signal being proportional to a difference between a desired output voltage of the DC-to-DC converter and an actual output voltage of the DC-to-DC converter, and (2) a second current source electrically coupled to the first current source at the integration node, the second current source adapted to generate the actual current signal, the actual current signal being proportional to a sum of current flowing through the DC-to-DC converter.

(B6) Any of the controllers denoted as (B1) through (B5) may further include an impedance network electrically coupled between the integration node and the modulator control node.

(C1) A method for controlling a DC-to-DC converter may include the following steps: (1) integrating a current deficit signal to generate a modulator control voltage, (2) generating control signals to control a switching circuit of the DC-to-DC converter based on at least the modulator control voltage to transfer power from an input power source to a load, and (3) preventing the modulator control voltage from falling below a predetermined minimum permissible value.

(C2) In method denoted as (C1), the predetermined minimum permissible value may be below a minimum threshold value of the modulator control voltage required to cause the switching circuit to transfer power from the input power source to the load.

(C3) In either of the methods denoted as (C1) or (C2): (1) the step of integrating may include integrating the current deficit signal using an integration subsystem, and (2) the step of preventing may include shunting a portion of the current deficit signal away from the integration subsystem.

(C4) Any of the methods denoted as (C1) through (C3) may further include: (1) generating a current command signal proportional to a difference between a desired output voltage of the DC-to-DC converter and an actual output voltage of the DC-to-DC converter, (2) generating an actual current signal proportional to a sum of current flowing through each energy storage inductor of the DC-to-DC converter, and (3) obtaining the current deficit signal from a difference between the current command signal and the actual current signal.

Changes may be made in the above methods and systems without departing from the scope hereof. For example, DC-to-DC converter 300 could be modified to have a boost-type topology, or a buck-boost type topology, instead of a buck-type topology. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A DC-to-DC converter, comprising:
one or more switching circuits;
a respective energy storage inductor electrically coupled to each of the one or more switching circuits; and
a controller, including:
a current deficit signal generator adapted to generate a current deficit signal, the current deficit signal representing a difference between a current command signal of the DC-to-DC converter and an actual current signal of the DC-to-DC converter,
an integration subsystem adapted to integrate the current deficit signal to generate a modulator control voltage,
one or more modulators adapted to control the one or more switching circuits to transfer power from an input power source to a load, based at least in part on the modulator control voltage, and
a clamping subsystem adapted to shunt a portion of the current deficit signal away from the integration subsystem, to prevent the modulator control voltage from falling below a predetermined minimum permissible value, the predetermined minimum permissible value being below a minimum threshold value of the modulator control voltage required for the one or more modulators to cause the one or more switching circuits to transfer power from the input power source to the load.

2. The DC-to-DC converter of claim 1, the clamping subsystem comprising:
a voltage source adapted to generate a reference voltage having the predetermined minimum permissible value;
a first amplifier adapted to amplify a difference between the reference voltage and the modulator control voltage; and
a current control device controlled by an output of the first amplifier and adapted to shunt the portion of the current deficit signal away from the integration subsystem.

3. The DC-to-DC converter of claim 2, the current control device comprising a transistor adapted to shunt the portion of the current deficit signal away from the integration subsystem.

4. The DC-to-DC converter of claim 3, the current deficit signal generator comprising:
a first current source adapted to generate the current command signal, the current command signal being proportional to a difference between a desired output voltage of the DC-to-DC converter and an actual output voltage of the DC-to-DC converter; and a second current source electrically coupled to the first current source, the second current source adapted to generate the actual current signal, the actual current signal being proportional to a sum of current flowing through each energy storage inductor.

5. The DC-to-DC converter of claim 4, wherein:
the first current source is electrically coupled to the second current source at an integration node;
the integration subsystem is electrically coupled between the integration node and a modulator control node;
the integration subsystem is adapted to set a voltage at the modulator control node to the modulator control voltage; and
each of the one or more modulators is electrically coupled to the modulator control node.

6. The DC-to-DC converter of claim 5, the integration subsystem comprising:
a second amplifier adapted to amplify a difference between a voltage at a common mode power supply rail and a voltage at the integration node, an output of the second amplifier being electrically coupled to the modulator control node; and
an impedance network electrically coupled between the integration node and the modulator control node.

7. The DC-to-DC converter of claim 1, the DC-to-DC converter being a multi-phase buck-type converter.

8. A controller for a DC-to-DC converter, comprising:
a current deficit signal generator electrically coupled to an integration node, the current deficit signal generator adapted to generate a current deficit signal representing a difference between a current command signal of the DC-to-DC converter and an actual current signal of the DC-to-DC converter;
an amplifier including an inverting input, a non-inverting input, and an output, the inverting input electrically coupled to the integration node, the non-inverting input electrically coupled to a common mode power supply rail, and the output electrically coupled to a modulator control node;
one or more modulators adapted to control one or more switching circuits of the DC-to-DC converter to transfer power from an input power source to a load, based at least in part on a voltage at the modulator control node; and
a clamping subsystem adapted to shunt a portion of the current deficit signal away from the integration node, to prevent the voltage at the modulator control node from falling below a predetermined minimum permissible value, the predetermined minimum permissible value being below a minimum threshold value of the modulator control voltage required for the one or more modulators to cause the one or more switching circuits to transfer power from the input power source to the load.

9. The controller of claim 8, the clamping subsystem comprising:
a voltage source adapted to generate a reference voltage having the predetermined minimum permissible value;
an additional amplifier adapted to amplify a difference between the reference voltage and the voltage at the modulator control node; and
a current control device controlled by an output of the additional amplifier and adapted to shunt the portion of the current deficit signal away from the integration node.

10. The controller of claim 9, the current control device comprising a transistor adapted to shunt current away from the integration node.

11. The controller of claim 10, the current deficit signal generator comprising:
- a first current source adapted to generate the current command signal, the current command signal being proportional to a difference between a desired output voltage of the DC-to-DC converter and an actual output voltage of the DC-to-DC converter; and
- a second current source electrically coupled to the first current source at the integration node, the second current source adapted to generate the actual current signal, the actual current signal being proportional to a sum of current flowing through the DC-to-DC converter.

12. The controller of claim 11, further comprising an impedance network electrically coupled between the integration node and the modulator control node.

13. A method for controlling a DC-to-DC converter, comprising:
- integrating a current deficit signal to generate a modulator control voltage;
- generating control signals to control a switching circuit of the DC-to-DC converter based on at least the modulator control voltage to transfer power from an input power source to a load; and
- preventing the modulator control voltage from falling below a predetermined minimum permissible value, the predetermined minimum permissible value being below a minimum threshold value of the modulator control voltage required to cause the switching circuit to transfer power from the input power source to the load.

14. The method of claim 13, wherein:
- the step of integrating comprises integrating the current deficit signal using an integration subsystem; and
- the step of preventing comprises shunting a portion of the current deficit signal away from the integration subsystem.

15. The method of claim 14, further comprising:
- generating a current command signal proportional to a difference between a desired output voltage of the DC-to-DC converter and an actual output voltage of the DC-to-DC converter;
- generating an actual current signal proportional to a sum of current flowing through each energy storage inductor of the DC-to-DC converter; and
- obtaining the current deficit signal from a difference between the current command signal and the actual current signal.

16. A DC-to-DC converter, comprising:
- one or more switching circuits;
- a respective energy storage inductor electrically coupled to each of the one or more switching circuits; and
- a controller, including:
  - a current deficit signal generator adapted to generate a current deficit signal, the current deficit signal representing a difference between a current command signal of the DC-to-DC converter and an actual current signal of the DC-to-DC converter,
  - an integration subsystem adapted to integrate the current deficit signal to generate a modulator control voltage at a modulator control node,
  - one or more modulators adapted to control the one or more switching circuits to transfer power from an input power source to a load, based at least in part on the modulator control voltage, and
  - a boosting subsystem adapted to inject current into the modulator control node to boost the modulator control voltage in response to a first signal indicating an operating mode change of the DC-to-DC converter.

17. The DC-to-DC converter of claim 16, further comprising a capacitor communicatively coupling the first signal to the boosting subsystem.

18. The DC-to-DC converter of claim 16, the first signal indicating the DC-to-DC converter is switching from a low power operating mode to a high power operating mode.

* * * * *